(No Model.)
S. W. ALLERTON & A. WEED.
PLOW.
No. 541,411. Patented June 18, 1895.
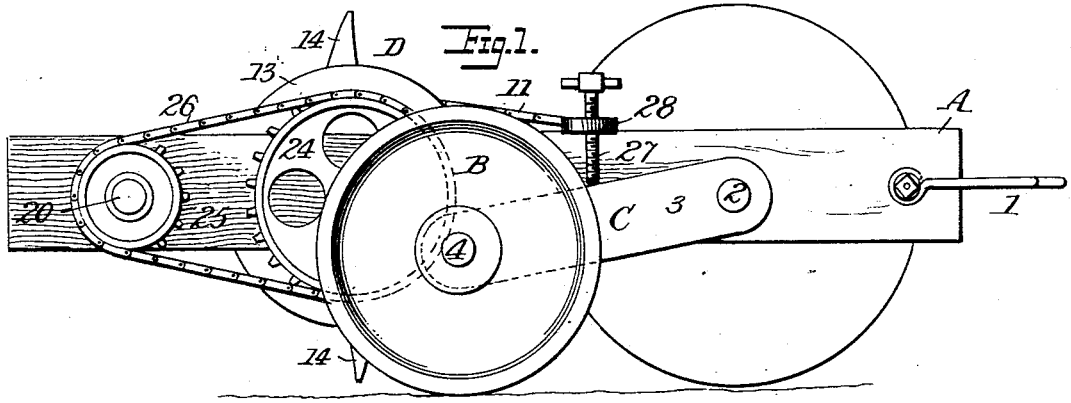
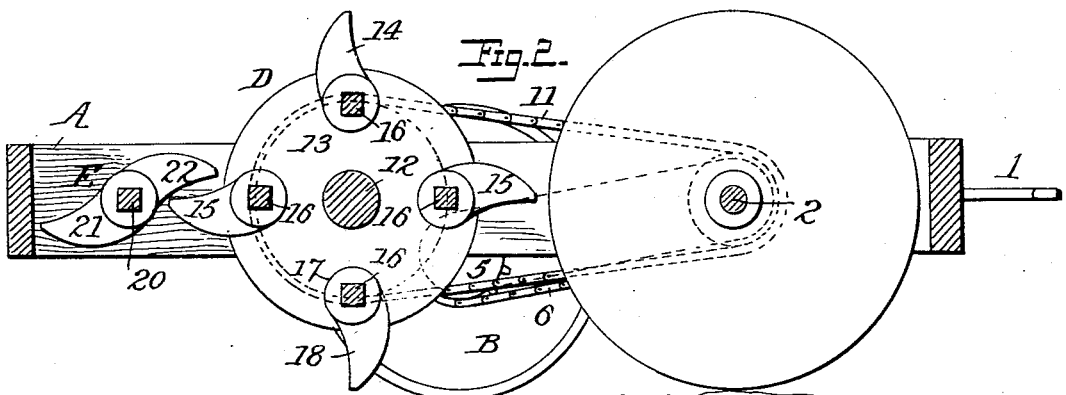
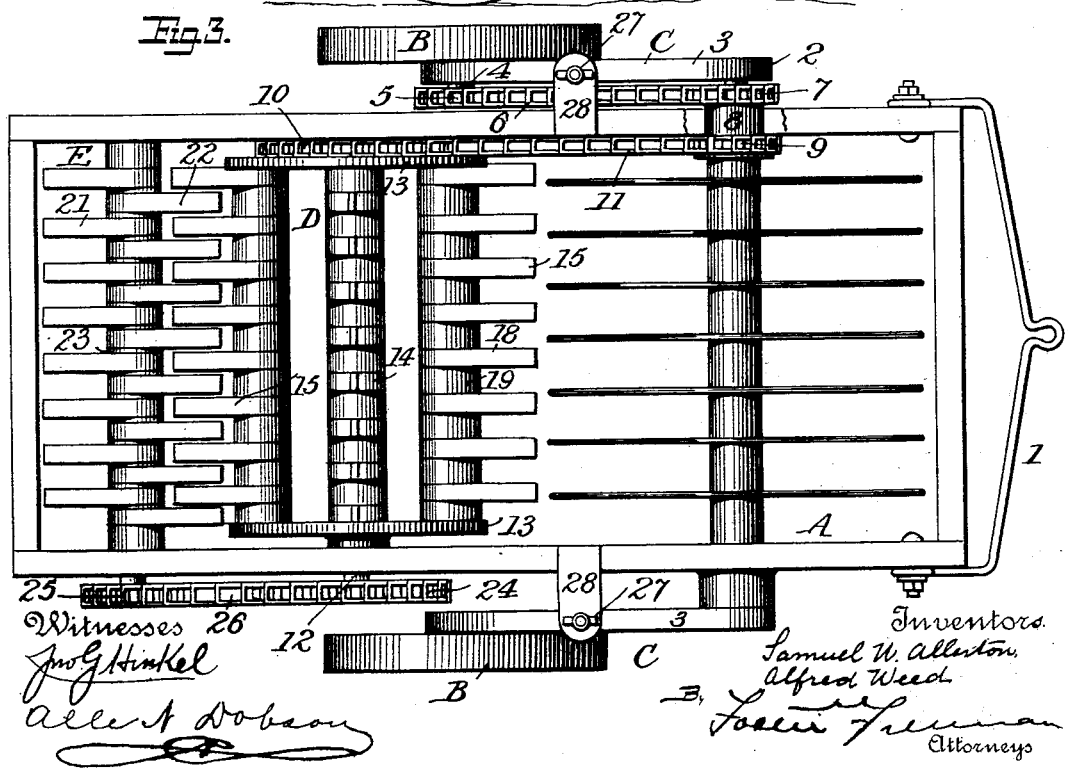
Witnesses
Jno G Hinkel
Albert Dobson
Inventors
Samuel W. Allerton
Alfred Weed
By Foster Freeman
Attorneys
THE NORRIS PETERS CO., PHOTO-LITHO., WASHINGTON, D. C.

UNITED STATES PATENT OFFICE.

SAMUEL W. ALLERTON, OF CHICAGO, ILLINOIS, AND ALFRED WEED, OF ANDERSON, INDIANA.

PLOW.

SPECIFICATION forming part of Letters Patent No. 541,411, dated June 18, 1895.

Application filed March 16, 1894. Serial No. 503,897. (No model.)

*To all whom it may concern:*

Be it known that we, SAMUEL W. ALLERTON, residing at Chicago, Cook county, Illinois, and ALFRED WEED, residing at Anderson, Madison county, Indiana, both citizens of the United States, have invented certain new and useful Improvements in Plows, of which the following is a specification.

Our invention relates to that class of plows in which there is a revolving head with radial teeth; and our invention consists in constructing and arranging the parts and in combining with the revolving head a revolving cleaner, as fully set forth hereinafter and as illustrated in the accompanying drawings, in which—

Figure 1 is a side view of our improved plow; Fig. 2, a longitudinal sectional elevation. Fig. 3 is a plan view.

The frame A, of the plow is of any suitable construction but, as shown it is a rectangular frame having side and end pieces and with a yoke 1, to which the draft animal may be hitched.

B, B, are the supporting wheels suitably arranged upon axles of a swinging frame C, the latter consisting of a shaft 2, and two arms 3, 3, fixed to said shaft. The axle or shaft 4 of one of the wheels B, has at the inner end a sprocket wheel 5, a chain 6 from which passes to a sprocket wheel 7, upon a sleeve 8, extending through the frame and turning on the shaft 2 and carrying a sprocket wheel 9. A chain 11 from the sprocket wheel 9, extends to another sprocket wheel 10 upon the shaft 12 of the revolving plow head D. The head D consists of the said shaft 12, two disks 13, 13, and two series of blades or teeth 14, 15.

As shown each series of teeth is mounted upon an angular cross-bar 16, extending between the heads 13, each tooth consisting of a hub 17, and a finger 18, the hub having an angular recess to receive the bar, and the teeth alternate on the bar with distance pieces or washers 19, so that by using washers of different thicknesses the teeth may be set as close together as desired. The fingers 18 of the teeth may be of any desired shape. As shown they are curved and pointed.

With the revolving head is combined a rotary cleaner E consisting of a shaft 20, carrying two series of teeth 21, 22, which are similar to the teeth of the revolving head but as the teeth are set upon the shaft 20 to extend from opposite sides thereof the hubs of one set of teeth act as distance pieces between the others and washers may be dispensed with or, when desired to set the teeth far apart, thin washers 23 may be used.

The shaft 12, of the head is driven, as before described, from the shaft 2 and the shaft 20 is driven from the shaft 12 by means of sprockets 24, 25, on the ends of the shaft and a chain 26, the sprocket 24 being twice the diameter of the sprocket 25, so that the cleaner shaft revolves twice to each revolution of the head. This revolution of the cleaner causes the teeth 22 of the cleaner to pass between the teeth 15 of the head, and the teeth 21 of the cleaner to pass between the teeth 14 of the head so that as the teeth 22 are opposite the spaces between the teeth 21 it is necessary to set the teeth 14 of the head opposite the spaces between the alternating teeth 15. By the use of angular shafts fitting angular openings in the disk 13 and removable teeth and washers with angular openings adapted to the said shafts, the necessary adjustments in order to set the teeth of the head in proper position to each other and to those of the cleaner can be readily made.

The swinging arms 3, 3, are set to bear against adjustable bearing screw 27, turning in lugs 28 on the frame whereby the extent to which the teeth shall penetrate the ground is readily regulated.

When the soil is soft and readily removed and there are no sticks or stalks to be crushed or broken the parts may be so adjusted that each set of teeth of the cleaner will be upon substantially a horizontal plane as the meeting set of teeth of the head reaches the said plane, the two sets of teeth therefore being in their mid-position upon the same horizontal plane. When, however, the soil is stiff and full of stalks and sticks it is desirable that one set of teeth shall shear with the other, and this may readily be insured by the use of the sprocket wheels 24, 25, and chains 26, by first taking off the chain from one of the wheels then turning the shaft 20, to set its teeth at an angle to the meeting teeth of the head when the latter are in a horizontal position as shown in Fig. 2 and then replacing the chain.

In order that the ground may be thoroughly broken up by the teeth of the head we have found it advantageous to arrange cutters in advance of the head, which may be in the form of sharp vertical bars or colters or, as shown, in the form of disks 30 turning freely on the shaft 2.

While we have shown certain means for driving the head from the wheels B, any other suitable means may be employed and the shaft 12 may be driven directly from the axle of the wheels if the axle is in stationary bearings, but we prefer to provide the movable bearings as thereby the frame A may be lifted to permit the plow to be readily drawn over the ground when it is being transported to the field, throwing the teeth out of action.

Without limiting ourselves to the precise construction and arrangement of parts shown and described, we claim as our invention—

1. The combination in a plow, of a swinging frame and the supporting wheels carried thereby, the forward shaft to which the frame is suspended, a revolving head provided with radial teeth, and means for operating said head from said forward shaft, substantially as described.

2. The combination in a plow, of a swinging frame and the supporting wheels carried thereby, the forward shaft to which said frame is suspended, and the cutting disks carried by said shaft, a revolving head provided with radial teeth, and means for operating said head from said shaft in the same direction as the cutting disks, substantially as described.

3. The combination in a plow, of a swinging frame and the supporting wheels carried thereby, means for adjusting said frame with respect to the main frame, the forward shaft to which the frame is suspended, a revolving head provided with radial teeth, and means for operating said head from said forward shaft, substantially as described.

4. The combination in a plow, of a swinging frame and the supporting wheels carried thereby, the main frame and means for adjusting said swinging frame with respect to said main frame, the forward shaft to which the swinging frame is suspended, and the cutting disks carried thereby, a revolving head provided with radial teeth, means for operating said head from said forward shaft, a revolving cleaner located to the rear of said head and provided with radial teeth, and means for operating said cleaner from said head, substantially as described.

5. The combination in a plow, of the main frame, the swinging frame and the supporting wheels carried by the latter, the forward shaft having the cutting disks, the plow head, the means for operating said head from said forward shaft, and a revolving cleaner carried upon a shaft to the rear of the head and comprising two series of teeth with the hubs of one set serving as distance pieces between the others, substantially as described.

6. The combination in a plow, of the head consisting of the end disks having angular openings, the central shaft, the angular cross-bars fitting said openings and teeth for penetrating the ground and having hubs with angular openings, the said teeth being arranged upon said cross-bars, substantially as described.

7. The combination in a plow, of the revolving head consisting of the central shaft, the end disks having angular openings, and cross-bars fitting said openings and provided with series of teeth for penetrating the ground, and intermediate distance pieces arranged upon said cross-bars, substantially as shown and for the purpose set forth.

8. The combination in a plow, of the swinging frame and the supporting wheels carried thereby, the forward shaft, a revolving head provided with radial teeth and operated from said forward shaft, a revolving cleaner with radial teeth, and a sprocket connection between said revolving head and cleaner, substantially as shown and for the purpose set forth.

In testimony whereof we have signed our names to this specification in the presence of two subscribing witnesses.

SAMUEL W. ALLERTON.
ALFRED WEED.

Witnesses:
G. S. ROBERTSON,
GEO. A. ERHART.